(12) United States Patent
Konrad et al.

(10) Patent No.: US 11,828,350 B2
(45) Date of Patent: Nov. 28, 2023

(54) ACTUATING DRIVE HAVING A WOUND FLAT SPRING AS A RESTORING SPRING, WHICH FLAT SPRING IS DESIGNED AS A CONSTANT-FORCE SPRING AND ACTS DIRECTLY ON AN ACTUATION CONNECTION POINT OF THE ACTUATING DRIVE

(71) Applicant: Siemens Schweiz AG, Zürich (CH)

(72) Inventors: Hilmar Konrad, Baar (CH); Felix Schilter, Altdorf (CH)

(73) Assignee: SIEMENS SCHWEIZ AG, Zurich (CH)

( * ) Notice: Subject to any disclaimer, the term of this patent is extended or adjusted under 35 U.S.C. 154(b) by 170 days.

(21) Appl. No.: 17/432,653

(22) PCT Filed: Feb. 20, 2020

(86) PCT No.: PCT/EP2020/054408
§ 371 (c)(1),
(2) Date: Aug. 20, 2021

(87) PCT Pub. No.: WO2020/169694
PCT Pub. Date: Aug. 27, 2020

(65) Prior Publication Data
US 2022/0163099 A1 May 26, 2022

(30) Foreign Application Priority Data
Feb. 21, 2019 (EP) ..................................... 19158538

(51) Int. Cl.
*F16H 19/00* (2006.01)
*F03G 1/02* (2006.01)
(Continued)

(52) U.S. Cl.
CPC ........... *F16H 19/001* (2013.01); *F03G 1/022* (2021.08); *F24F 13/1426* (2013.01);
(Continued)

(58) Field of Classification Search
CPC ....... E06B 9/322; E06B 9/60; E05D 13/1276; F03G 1/00; F03G 1/022; F16H 19/001; F16H 2035/006
See application file for complete search history.

(56) References Cited

U.S. PATENT DOCUMENTS

| 635,755 A | 1/1987 | Arechaga ........................ 185/45 |
| 531,257 A | 7/1996 | Kuhar ........................ 160/168.1 |

(Continued)

FOREIGN PATENT DOCUMENTS

| CN | 104 089 068 | 10/2014 |
| DE | 10 2015 210648 | 12/2016 |

(Continued)

OTHER PUBLICATIONS

Search Report for International Application No. PCT/EP2020/054408, 5 pages, dated May 13, 2020.

*Primary Examiner* — Jake Cook
(74) *Attorney, Agent, or Firm* — Slayden Grubert Beard PLLC

(57) ABSTRACT

Various embodiments of the teachings herein include an actuating drive comprising: a drive element; an actuation element; and a restoring spring. The drive element drives the actuation element indirectly about an actuation axis. The actuation element includes a shaft portion concentric to the actuation axis and extends at least partially circumferentially. The restoring spring includes a wound flat spring providing a restoring torque on the actuation element, acting tangentially on the shaft portion, and a free spring end tangentially fastened to the shaft portion. The free spring end (Continued)

is radially externally disposed with respect to the spring axis and fastened tangentially to the shaft portion. The spring is mounted rotatably so the spring axis is radially spaced apart from the actuation axis and aligned parallel to the actuation axis.

13 Claims, 5 Drawing Sheets

(51) Int. Cl.
  *F24F 13/14* (2006.01)
  *F16H 35/00* (2006.01)
(52) U.S. Cl.
  CPC .. *F16H 2035/006* (2013.01); *F24F 2013/146* (2013.01); *F24F 2013/1446* (2013.01)

(56) References Cited

U.S. PATENT DOCUMENTS

| | | | |
|---|---|---|---|
| 10,221,619 B2 * | 3/2019 | Chen | E06B 9/322 |
| 10,982,488 B2 * | 4/2021 | Chen | B65H 75/486 |
| 2014/0345400 A1 | 11/2014 | Bourqui | 74/89.16 |
| 2018/0340705 A1 | 11/2018 | Böttger | F24F 13/14 |

FOREIGN PATENT DOCUMENTS

| | | |
|---|---|---|
| DE | 10 2016 001141 | 8/2017 |
| DE | 10 2017 209459 | 12/2018 |

* cited by examiner

ACTUATING DRIVE HAVING A WOUND FLAT SPRING AS A RESTORING SPRING, WHICH FLAT SPRING IS DESIGNED AS A CONSTANT-FORCE SPRING AND ACTS DIRECTLY ON AN ACTUATION CONNECTION POINT OF THE ACTUATING DRIVE

CROSS-REFERENCE TO RELATED APPLICATIONS

This application is a U.S. National Stage Application of International Application No. PCT/EP2020/054408 filed Feb. 20, 2020, which designates the United States of America, and claims priority to EP Application No. 19158538.9 filed Feb. 21, 2019, the contents of which are hereby incorporated by reference in their entirety.

TECHNICAL FIELD

The invention relates to actuating drives. Various embodiments of the teachings herein may include an actuating drive having a drive element and an actuation element with an actuation connection point.

BACKGROUND

A cableless, balanced louver blind or a roller blind having a spring motor with constant or variable force is known from U.S. Pat. No. 5,531,257. The louver blind or the roller blind has conventional window-covering components without externally suspended lifting cords or cord locking mechanisms. One or more spring motors are used. A cord spool is coupled with one of the spring drums and serves to wind up the cords in order to effect the raising or lowering of the louver blind, simply by manipulation of the bottom bar of the louver blind system. On account of the spring forces, the system compensates for the increasing weight on the cords as the window covering is raised and for the decreasing weight as it is lowered.

An actuating drive is described in Chinese patent CN 104 089 068 B which has an electric motor, a worm gear unit connected downstream therefrom, and a shaft with an actuation connection point as the actuation element, which shaft can be driven via the worm gear unit. The shaft comprises a shaft portion which is arranged centrically to the actuation axis and extends partially circumferentially in the tangential circumferential direction. The actuating drive further has, as a restoring spring, a wound flat spring in the form of a drive spring for providing a restoring torque acting on the actuation element. The spring axis of the wound flat spring and the actuation axis of the shaft are aligned with one another. The drive spring has a radially internally disposed free spring end which is fastened tangentially to the shaft portion (see FIG. 5 there).

An actuating apparatus is described in the German patent application DE 10 2016 001 141 A1 which has a drive motor, a gear unit connected downstream therefrom, and an actuator with an actuation axis which can be driven thereby. The gear unit comprises a toothed wheel mounted rotatably about an axis of rotation. On an open end face of the toothed wheel extending transversely to the axis of rotation, a groove is provided which extends between two contact areas in the circumferential direction to the axis of rotation (see FIG. 1b, FIG. 1c). A restoring spring which can be tensioned by rotating the carrier about the axis of rotation and connected mechanically via a retaining element is arranged between a carrier, which is rotatable about the axis of rotation independently of the toothed wheel and has a pin which engages into the groove, and a frame of the actuating apparatus. The retaining element is mounted movably between a retaining position and a release position. By means of the retaining element, the drive motor can be separated from the restoring spring so that it is not subject to unnecessary stress during operation. When the end position of the actuating apparatus is reached, the carrier is secured by the retaining element. If a malfunction occurs, the retaining element is moved into the release position. The restoring spring then rotates the carrier back about the axis of rotation until its pin rests on the contact area and carries the gear element until the component to be moved reaches the safety position.

In the German patent application DE 10 2015 210 648 A1, an actuating drive is described which has a motor, a gear unit, and an actuation connection point. The motor is suitable for driving the actuation connection point by means of the gear unit. Here, the actuating drive comprises a spring, which is suitable for acting on the actuation connection point along the drive direction independently of the gear unit. An actuating drive of this kind is provided for example to drive a flap connected to the actuation connection point or a valve connected there, in particular for the heating, ventilation or air-conditioning of a building. An at least partial integration of the actuation element into a flap or into a valve is also conceivable.

With the actuating drives considered within the scope of the disclosure, the actuation element is arranged such that it can be rotated about its actuation axis within a predefined angle of rotation range between a rest position (start position) and an operating position (end position). The maximum actuation angle range between these two rotational positions lies at 90°±10°. Both rotational positions usually also form end stops. Furthermore, the rest position can be provided such that the actuating drive is reset automatically into said rest position by means of the pretensioned wound flat spring as soon as the actuating drive is in the de-energized state.

As already explained above, actuating drives of this kind can often be used in heating, ventilation or cooling systems in a building. It is therefore a common requirement for such actuating drives to be reliable, durable, cost-effective, compact and capable of being manufactured in large volumes.

US patent application 2014/345400 A1 describes the use of a solid cylindrical helical spring as a restoring spring, which is arranged coaxially to the actuation connection point and moves the latter back directly in reverse operation. Such a helical spring does however have a very "hard", steep characteristic curve. In order to compensate the steepness, a combined toothed wheel assembly comprising a spiral, non-circular toothed wheel and a circular toothed wheel axially spaced apart therefrom and connected in a fixed manner thereto is disposed upstream of the actuation connection point. Here, the non-circular toothed wheel engages with a likewise spiral, non-circular toothed segment of the actuation connection point. The toothed wheel assembly shown and the actuation connection point require a mechanically heavy, solid design with a substantial installation depth.

Furthermore, the use of a pretensioned drive spring as a restoring spring for an actuating drive is known, wherein the drive spring is then arranged coaxially to a toothed wheel of the reduction gear unit and wherein this toothed wheel acts on the actuation connection point via at least one further downstream toothed wheel of the reduction gear unit. The drive spring comprises a multiplicity of windings, for example between 15 and 50 windings. As a result, the drive spring has a soft, in other words "flat" spring characteristic curve in order to achieve an approximately linear force progression. Here, the first, typically radially internally disposed spring end of the drive spring acts on this toothed wheel while the second, radially externally disposed spring end of the drive spring is connected as a torque counteracting support on the housing or to a fixed component of the housing of the actuating drive. By means of the drive spring, the actuation connection point then moves relatively evenly back into the rest position. However, such a drive spring with the multiplicity of windings is technically complex and heavy.

SUMMARY

The teachings of the present disclosure may be used to overcome, at least in part, the above-mentioned disadvantages associated with actuating drives. Some embodiments of the teachings herein include an actuating drive which, with regard to the wound flat spring, has a simpler and more lightweight design which can be used more flexibly.

As an example, some embodiments of the teachings herein include an actuating drive, having a drive element and an actuation element (10) with an actuation connection point (AN), wherein the drive element is provided for driving the actuation element (10) indirectly about an actuation axis (A), wherein the actuation element (10) has a shaft portion (3) which is arranged centrically to the actuation axis (A) and extends at least partially circumferentially in the tangential circumferential direction, wherein the actuating drive has, as a restoring spring, a wound flat spring (2) for providing a restoring torque (M) acting on the actuation element (10), which flat spring acts tangentially on the shaft portion (3), and wherein the wound flat spring (2) has a spring axis (FA) and a free spring end (E) which is tangentially fastened to the shaft portion (3), characterized in that a free spring end (E) of the wound flat spring (2) which is radially externally disposed with respect to the spring axis (FA) is fastened tangentially to the shaft portion (3), that the wound flat spring (2) is mounted rotatably such that the spring axis (FA) thereof is radially spaced apart from the actuation axis (A) and aligned parallel to the actuation axis (A), and that the actuation element (10) is arranged such that it can be rotated about its actuation axis (A) within a predefined angle of rotation range (α, β) between a rest position (RS) and an operating position (BS).

In some embodiments, the wound flat spring (2) is a roller spring with a number of windings resting directly on one another in the range from 1 to 5.

In some embodiments, the roller spring (2) is a constant-force spring.

In some embodiments, the wound flat spring (2) is a spiral drive spring with a number of windings in the range from 6 to 25.

In some embodiments, the wound flat spring (2) has a free roller end (RE), which is extended by a non-rigid linear or strip-type extension element (22) with high tensile strength, and wherein the free end of this extension element (22) now forms the free spring end (E) of the wound flat spring (2').

In some embodiments, the free spring end (E) is fastened to a fastening point (4) mounted on the radial outer circumference of the shaft portion (3).

In some embodiments, the fastening point (4) is a hinge which can be rotated about a pivot axis running parallel to the actuation axis (A).

In some embodiments, at least two, at most three or four control cams ($N_1$-$N_3$) are arranged in a distributed manner on the shaft portion (3) or axially adjacent thereto, tangentially to the actuation axis (A), and the actuating drive (1) has an electrical switch element (SE), which can be operated by the respective control cams ($N_1$-$N_3$) for monitoring the end position of the actuation element (10).

In some embodiments, the shaft portion (3), apart from at least one tangential shaft portion region (4, $N_1$-$N_3$), has a substantially uniform shaft portion radius (R) and wherein in comparison thereto the at least one tangential shaft portion region (4, $N_1$-$N_3$) has an increased shaft portion radius (R+).

In some embodiments, one of the control cams ($N_1$) is simultaneously a hinge (4) which is mounted rotatably on a radial outer circumference of the shaft portion (3).

In some embodiments, the wound flat spring (2, 2') is already pretensioned in the rest position (RS) in order to provide the restoring torque (M, $M_v$).

In some embodiments, the shaft portion (3) arranged on the actuation element (10) is fixed radially to the actuation element (10) in relation to the actuation axis (A) of the actuation element (10) and wherein the actuating drive (1) has an in particular manually operable unlocking and locking mechanism (EVM) for disconnecting and restoring a tangential rotational fixing between the actuation element (10) together with the actuation connection point (AN) and the shaft portion (3).

In some embodiments, the actuating drive (1) has a manually operable pretensioning mechanism (VSM) for pretensioning the wound flat spring (2, 2').

In some embodiments, the actuating drive has a gear unit (G), wherein the drive element has a mechanical active connection with the actuation element (10) via the gear unit (G) and wherein the actuation element (10) has a toothed segment (10) as the gear-side output.

In some embodiments, the shaft portion (3) of the toothed segment (10) is axially spaced apart from the toothing plane (VE) thereof.

BRIEF DESCRIPTION OF THE DRAWINGS

Further advantages, features, and details of the teachings herein will emerge from the description which follows, in which various example embodiments are described in detail with reference to the drawings. Here, the features disclosed in the claims and in the description can each be employed individually or in any combination. Elements with the same function and effect are each provided with the same reference characters in FIGS. 1 to 15. In the drawings, in schematic form:

DETAILED DESCRIPTION

Figure 1:
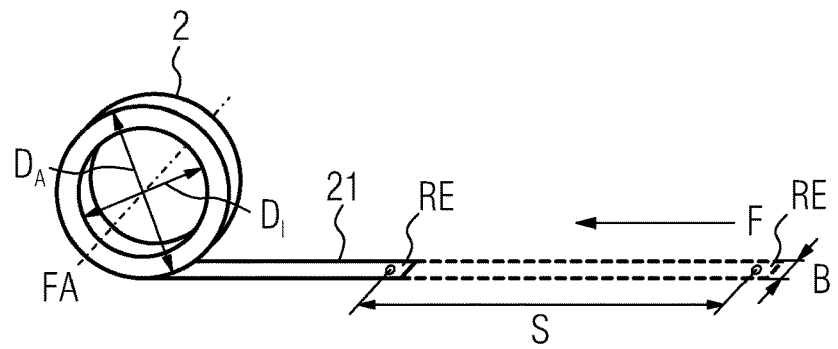
FIG. 1 shows an example of a wound flat spring embodied as a constant-force spring.

In some embodiments, a drive element is provided for driving an actuation element indirectly or directly about an actuation axis. The actuation element has a shaft portion which is arranged centrically to the actuation axis and extends at least partially circumferentially in the tangential circumferential direction. The actuating drive has, as a restoring spring, a wound flat spring for providing a restoring torque acting on the actuation element, which flat spring acts tangentially on the shaft portion. The wound flat spring has a spring axis or roller axis and a free spring end which is tangentially fastened to the shaft portion. Wound flat springs of this kind are often also referred to as strip springs.

The actuating drive can have a (reduction) gear unit. In this case, the drive element has a mechanical active connection with the actuation element via the gear unit. The actuating drive can have as a restoring spring or can itself be a wound flat spring acting on the actuation element, which flat spring has a mechanical active connection with the actuation element for providing a restoring torque acting on the actuation element.

In some embodiments, a free spring end of the wound flat spring which is radially externally disposed with respect to the spring axis is fastened tangentially to the shaft portion. The wound flat spring is mounted or arranged rotatably such that the spring axis thereof is radially spaced apart from and aligned parallel to the actuation axis.

The rotatable mounting about the spring axis can be effected for example by way of a drum, with a radially internally disposed flat spring end fastened to or resting thereon in order to enable the free, radially externally disposed spring end to be unwound by the shaft portion of the actuation element. The drum can be arranged in a fixed manner on the housing of the actuating drive or mounted such that it can rotate about a centric drum axis in the actuating drive. The wound flat spring has two spring ends or flat spring ends which lie opposite one another along the linear longitudinal extension of the wound flat spring. The free, radially externally disposed flat spring end is fastened to the circumference of the shaft portion, e.g. in a movable manner with minimal play. It thus engages directly on the shaft circumference. The drive element is usually an electric motor. In some embodiments, it can be a hydraulic or pneumatic actuator.

In contrast to the typical drive springs described in the introduction, in some embodiments of the present disclosure the second spring end, in other words the radially externally disposed spring end of the wound flat spring is not arranged in a fixed manner on the housing. By contrast, the central, radially internally disposed spring end of the drive spring acts directly on a shaft, while the radially externally disposed spring end is connected in a fixed manner to the housing or a housing part as a supporting bearing. As a result of the direct engagement of the wound flat spring on the actuation element, a particularly compact design of the actuating drive is possible while minimizing the installation height. At the same time, the remaining toothed wheels of the gear unit or reduction gear unit are free from stress despite the pretensioned wound flat spring.

In some embodiments, the fastening of the free flat spring end on the shaft portion enables a particularly simple reversal of the direction of rotation of the actuating drive (counterclockwise/clockwise rotation) with an associated reversal of the restoring torque (see FIG. 4-FIG. 7). This is because the installation direction of an actuating drive is often confused during assembly, as an actuating drive must be installed accordingly (top side or bottom side) depending on the installation situation (end stop on the right or left). In such a case, the actuating drive must then be removed and re-installed the other way round. This may be labor-intensive and time-consuming. In contrast, using a single wound flat spring, it is possible to achieve both an almost even return of the actuating drive in reverse operation and also a simple reversal of the direction of rotation and of the restoring torque.

In some embodiments, the actuation angle range between two rotational positions lies at 90°±10°. However, since the free spring end of the wound flat spring is wound up along the circumferential shaft portion when the actuation element is moved into the operating position, the maximum possible actuation angle range can comprise several revolutions, in other words up to 360°, 720°, 1080°, etc.

In some embodiments, the wound flat spring embodied as a spiral drive spring has a number of windings in the range of 5 to 10 or 6 to 15 windings. In this case, the free spring end is disposed radially externally, while the central, radially internally disposed spring end is connected in a fixed manner by way of a bolt fixed to the housing or an axis fixed to the housing, or is loose. In particular, a drive spring of this kind has a spring rate which differs by no more than 10%, no more than 5%, between the operating position and the rest position of the actuating drive. In some embodiments, the wound flat spring is a roller spring with a number of windings resting directly on one another in the range from 1 to 5.

In some embodiments, the roller spring and thus the wound flat spring is a constant-force spring. Such a constant-force spring can therefore be considered as a special embodiment of a roller spring with an effectively constant travel/force progression. The constant-force spring has at least a half winding, preferably several windings which (always) rest directly on one another, apart from a free spring end which may point tangentially away from the circumference of the roller when the constant-force spring is untensioned. Springs of this kind are typically used for the height adjustment of vertical sliding windows and computer monitors. In this case, a particularly even return in reverse operation and a simple reversal of the direction of rotation are possible in a particularly advantageous manner by means of a single compact and light constant-force spring. On account of the "even spring characteristic curve", the motor does not need to be overdimensioned, since the drive torque to be supplied by it is practically constant. A more cost-effective motor can be used.

An ideal spring with constant force is by definition a spring in which the force which it exerts over its movement range is a constant, in other words it does not follow Hooke's law. In reality, "springs with constant force", in other words the constant-force springs under consideration here, do not actually supply a constant force, and they are manufactured from materials which follow Hooke's law. In general, such constant-force springs are designed as a rolled strip of spring steel, so that the spring is present in the untensioned state in wound-up form with windings which always rest directly on one another. The approximation to "constant force" results from a long stroke and a pretensioned rest position, so that the starting force does not begin at zero (Newton) but at a finite value.

With the constant-force springs under consideration, the ratio of the spring force in the operating position to the spring force in the pretensioned rest position lies in the range from 1 to 1.1, preferably in the range from 1.02 to 1.05. The slight increase in the spring force in the operating position results from the reduction of the radius caused by the unwinding of the spring strip. This can be compensated by a corresponding increase in the width of the spring strip toward the free end.

In comparison to the typical spiral drive springs, in which the windings mostly do not rest against each other when the drive spring is used as intended, the spring force produced during the unwinding of the constant-force springs under consideration results exclusively from the change to the bending radius at the unwinding point. With the drive springs, on the other hand, the spring force produced during unwinding is distributed across a part of the windings. For this reason, the constant-force springs under consideration here may be significantly more compact in comparison to drive springs. On account of the use of special spring steels, in particular textured carbon and stainless steels, they advantageously also have a significantly higher spring force.

The constant-force springs under consideration have an outer and inner diameter, the ratio of which to one another lies in particular in the range from 1.1 to 1.5, and/or in the range from 1.2 to 1.3. In some embodiments, the ratio of the outer diameter to the typically constant roller width lies in the range from 0.5 to 3, or in the range 1 to 2. The constant-force springs embodied as a roller thus have a hollow-cylindrical design. Such a constant-force spring can be mounted for example on a drum, wherein one and a half windings should remain on the drum in the fully unwound state. Constant-force springs are available for example from the companies Kern-Liebers, Ming Tai Industrial Co., Hunter Springs or Vulcan Springs.

In some embodiments, the wound flat spring can be mounted, with its natural, self-setting, radially internally disposed smallest diameter, rotatably on a cylindrical bearing fixed to the housing. The bearing fixed to the housing may then be dimensioned such that it delimits and guides the hollow-cylindrical wound flat spring from the inside. It is not necessary here for the spring end disposed opposite the radially externally disposed free spring end of the wound flat spring to be fixed to the housing.

In some embodiments, the hollow-cylindrical wound flat spring can be mounted and guided such that it is delimited radially from the outside, for example in a hollow-cylindrical receiving shell with a corresponding cut-out present in the circumferential direction for the free, radially externally disposed spring end to pass through.

In some embodiments, the wound flat spring has a free roller end, which is extended by an in particular linear or strip-type extension element. In particular, the extension element is non-rigid. It may have high tensile strength. The free end of this extension element now forms the free spring end of the (extended) wound flat spring. Such a non-rigid, dimensionally unstable component has a low modulus of elasticity and a low axial rigidity. Such a component undergoes significant deformation when subjected to even minimal forces and torques. The extension element can be for example a strip, a belt, a cable, a strand or a chain. The strip, the cable or the strand can be manufactured from a braid of metal wires or synthetic fibers, for example from steel wires, from nylon fibers or from Kevlar fibers.

In some embodiments, the spring force for both directions of rotation is exactly the same in terms of amount and is substantially constant, since the extension element lacks the property of spring elasticity. In this case, there is no contribution dependent on the direction of rotation to the restoring torque which otherwise acts upon the actuation connection point.

In some embodiments, the free spring end is fastened to a fastening point mounted on the radial outer circumference of the shaft portion. The shaft portion thus comprises this fastening point. The fastening point can for example be a rivet or a screw, which engages through a fastening hole in or on the free end of the wound flat spring. The fastening point may be a hinge, which is rotatable about a pivot axis running parallel to the actuation axis. As a result, a simple fastening of the free flat spring end on the outer circumference of the shaft portion is possible. In the case of a hinge, it is moreover possible to reverse the direction of rotation smoothly by pivoting the hinge.

In some embodiments, at least two, three, or four control cams are arranged in a distributed manner on the shaft portion or axially adjacent thereto, tangentially to the actuation axis. The actuating drive has a (single) electrical switch element, which can be operated by the respective control cams, for monitoring the end position of the actuation element. The switch element can be for example a microswitch, a light barrier or a proximity switch. A rest and operating position can thus be assigned to each switch operation, for both directions of rotation respectively. The control cams can be arranged such that they can be displaced and fixed about the actuation axis for adjusting these "end stops" in the tangential direction.

In some embodiments, the shaft portion, apart from at least one tangential shaft portion region, has a substantially uniform shaft portion radius. In comparison thereto, the at least one tangential shaft portion region has an increased shaft portion radius, for example increased by 10 to 20%. This may be arranged in the circumferential direction such that in an operating or rest position it is simultaneously the lever point for the free spring end acting on the shaft portion. On account of the increased shaft portion radius, an increased closure torque can be achieved in the operating or rest position, for example to keep a smoke flap closed in a ventilation channel of a building.

In some embodiments, one of the control cams is simultaneously the hinge mounted on the radial outer circumference of the shaft portion. The hinge thus fulfills two functions, namely the fastening of the free spring end and the operation of the switch element for end position monitoring. In some embodiments, the wound flat spring is already pretensioned in the rest position in order to provide the restoring torque. As a result, the full spring force or the full restoring torque is still applied even in the rest position.

In some embodiments, the shaft portion arranged on the actuation element is fixed radially to the actuation element in relation to the actuation axis of the actuation element. The actuating drive has an in particular manually operable unlocking and locking mechanism for disconnecting and restoring a tangential rotational fixing between the actuation element together with the actuation connection point on the one hand and the shaft portion on the other hand. As a result, a reversal of the direction of rotation of the actuation element (clockwise/counterclockwise) is possible.

In order to be able to reverse the direction of rotation and the restoring torque, the wound flat spring must first be uncoupled from the actuation element with the actuation connection point and from the rest of the gear unit, for example by radially disengaging a bolt or bar by operating a slide or pushbutton. The actuation element can then be moved for example manually with minimal force from the one end position to the opposite end position. The motor and the gear unit of the actuating drive are typically also driven manually when the end positions are switched. Once the end position has been switched, the tangential rotational fixing is restored, for example by radially re-engaging a bolt or bar connected to an exemplary slide or pushbutton by releasing it. In some embodiments, the shaft portion has a radially internally disposed part and a radially externally disposed part arranged coaxially thereto. Here, the radially internally disposed part is connected in a fixed manner to the actuation element, in other words to the toothed segment, which in turn engages with a transmission toothed wheel.

In some embodiments, the actuating drive has a manually operable mechanism for pretensioning the wound flat spring. The pretensioning mechanism can have a toothed wheel which engages directly with the shaft portion as part of the pretensioning mechanism. In this case, the shaft portion has a corresponding outer toothing on its outer circumference as a further part of the pretensioning mechanism. The ratio of the toothed outer diameter of the toothed wheel to the toothed outer diameter of the shaft portion lies in the sense of a reduction in particular in a range from 0.1 to 0.5, or in the range from 0.2 to 0.3. In some embodiments, the toothed wheel has a central opening for introducing a suitable tool, such as a chuck key. This enables the actuation connection point to be pretensioned manually with a few rotations in the opposite direction. The chuck key can be for example a hex key and the central opening can be a hexagon socket opening. The outer toothing of the shaft portion is preferably disposed axially in a different plane than the outer circumference of the shaft portion for winding up the spring strip.

The locking and unlocking mechanism and the pretensioning mechanism can of course also be realized by a common mechanism. In this way, for example, the toothed wheel in the locked state can simultaneously engage with a similarly embodied outer toothing of the previously described radially internally disposed part and the radially externally disposed part of the shaft portion disposed coaxially thereto. In the unlocked state, the toothed wheel can only engage with the radially externally disposed part of the shaft portion as a result of being axially disengaged.

In some embodiments, the actuating drive has a gear unit, e.g. a reduction gear unit. The drive element has a mechanical active connection with the actuation element via the gear unit. The actuation element has a toothed wheel, in particular a toothed segment, as the gear-side output. Finally, the gear unit has an output toothed wheel on the output side. The actuation element is then formed at least partially by the output toothed wheel. The shaft portion of the toothed wheel or the toothed segment is axially spaced apart from the toothing plane thereof.

FIG. 1 shows an example of a wound flat spring or roller spring already embodied as a constant-force spring 2. $D_A$ designates the outer diameter, $D_I$ designates the inner diameter, and B designates the width of the wound flat spring 2 shown. The reference character 21 designates a spring strip, preferably a steel spring strip, which points tangentially away from the outer circumference of the constant-force spring 2. In the present example, a roller end designated with RE is unwound further by a spring travel S, shown by a dashed line, wherein a constant spring force F is ideally maintained.

Figure 2:
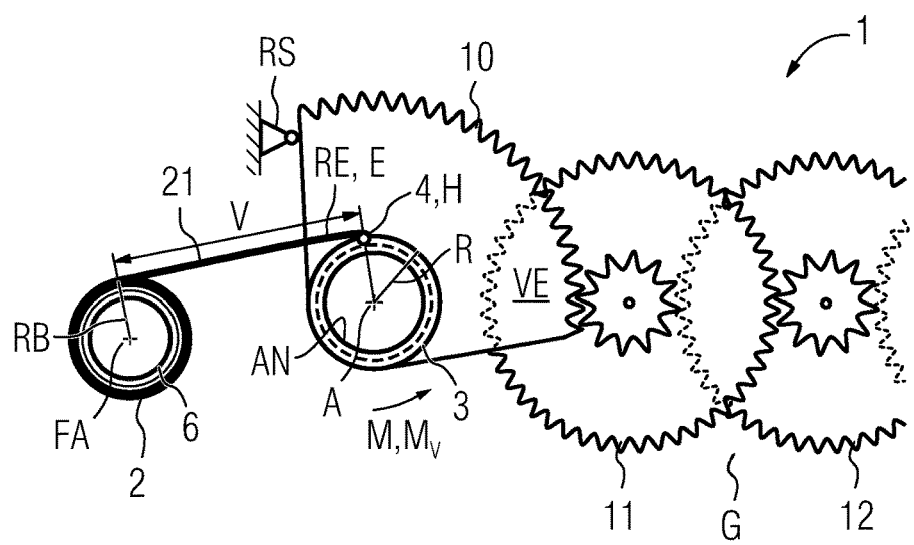
FIG. 2 shows an exemplary constant-force spring acting tangentially on a shaft portion of an actuation element of an actuating drive incorporating teachings of the present disclosure in a rest position.

FIG. 2 shows an exemplary constant-force spring 2 acting tangentially on a shaft portion 3 of an actuation element 10 of an actuating drive 1 incorporating teachings of the present disclosure in a rest position RS. The actuating drive 1 here has a drive element (not shown further) such as an electric motor, a gear unit G and the actuation element 10, which in turn comprises an actuation connection point AN. The actuation connection point AN is provided for connecting a flap or a valve. The drive element is provided for driving the actuation element 10 about an actuation axis A. The gear unit G thus has a mechanical active connection with the actuation element 10. Furthermore, the gear unit G has several toothed wheels 11, 12 which engage with one another. The toothed wheel 11 moreover engages with the actuation element 10, which is embodied here as a toothed segment. VE furthermore designates a toothing plane or effective plane, in which all toothed wheels 10, 11 and the toothed segment 10 are located. In FIG. 2, the toothed segment 10 rests on an end stop in the rest position RS shown.

Furthermore, the actuating drive 1 has a wound flat spring 2 acting on an actuation element 10, which flat spring has a mechanical active connection with the actuation element 10 in order to provide a restoring torque M acting on the actuation element 10. In the present example, the wound flat spring 2 embodied as a roller, in other words the constant-force spring 2, is already pretensioned or has a pretensioning torque $M_V$ on account of the spring strip 21 being partly unwound. When the constant-force spring 2 is used as a restoring spring in accordance with the invention, this also corresponds substantially to the restoring torque M in actuation operation. In the present invention, the ratio of a corresponding pretensioning section V to an outer radius RB of the roller generally lies in the range from 1 to 8, preferably in the range from 3 to 6.

In some embodiments, the actuation element 10 now has the shaft portion 3 which is arranged centrically to the actuation axis A and extends at least partially circumferentially in the tangential circumferential direction. In addition, a free spring end E of the wound flat spring 2 is fastened tangentially to the shaft portion 3. In the present example, the free spring end E is a fastening point such as a rivet or a screw connection. Furthermore, the shaft portion 3 which extends at least partially circumferentially extends fully circumferentially in the present example. It is furthermore embodied by way of example as a cylindrical hollow shaft with a central through opening (not described further here). The latter also extends through the actuation element 10 on which this hollow shaft 3 is (fixedly) arranged. The actuation element 10 and the hollow shaft 3 can also be embodied in one piece.

In FIG. 2, the spring strip 21 of the constant-force spring 2 acts on the fastening point 4, which is simultaneously also a lever point H. In other words, the constant-force spring 2 with a lever travel corresponding to the outer radius R of the shaft portion 3 is tensioned in the clockwise direction and wound up along the outer circumference of the shaft portion 3 when the toothed segment 10 is driven. During this process, the spring strip 21 is wound up by the roller of the constant-force spring 2. The constant-force spring 2 is by way of example itself mounted on a drum 6. RB designates the outer radius of the roller of the constant-force spring 2 and FA designates the spring axis of the drum 6 or of the constant-force spring 2. The wound flat spring 2 embodied as a constant-force spring 2 is spaced radially apart from the actuation axis A and mounted rotatably about the spring axis FA running parallel to the actuation axis A. The roller of the constant-force spring 2 preferably still has at least a half winding in the maximally unwound state, in other words on reaching the operating position. In some embodiments, approximately one and a half windings will still remain in the operating position. Here, the windings always rest on one another.

Figure 3:
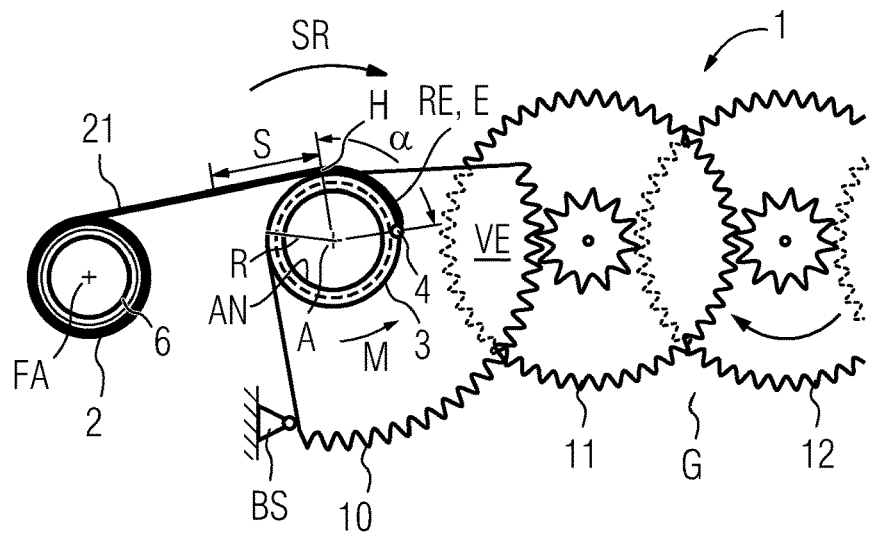
FIG. 3 shows the actuating drive according to FIG. 2 in an operating position.

FIG. 3 shows the exemplary actuating drive 1 according to FIG. 2 in an operating position BS. In comparison with the preceding FIG. 2, the actuation element 10 has now been moved from the rest position RS into the operating position BS by means of the driven gear unit G by the indicated actuation angle α. Here, SR designates a first actuation direction, in other words a clockwise direction. S designates the spring travel by which the spring strip 21 of the constant-force spring 2 shown has been unwound from the shaft portion 3 as a result of the rotation thereof. Here, the spring travel S corresponds in terms of amount to approximately the arc length of the spring strip 21 wound up on the shaft portion 3. The arc length itself results from the product of the actuation angle α and the outer radius R of the shaft portion 3.

Figure 4:
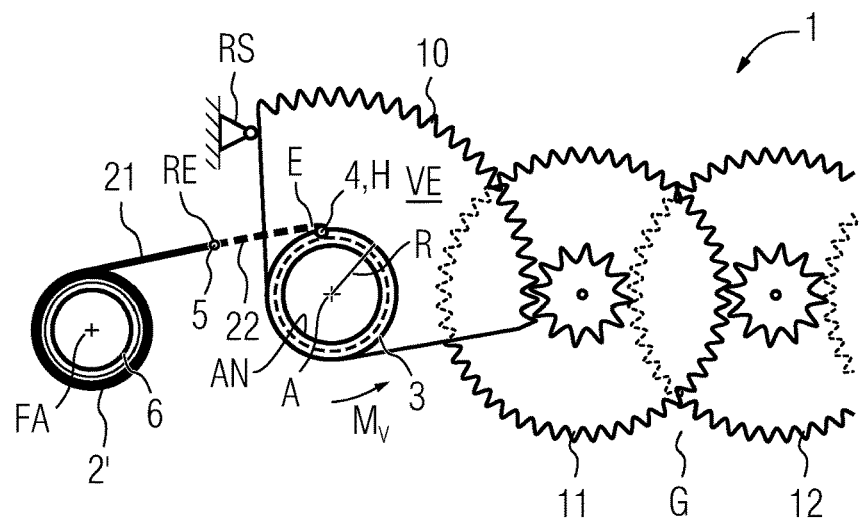
FIG. 4 shows the exemplary actuating drive according to FIG. 2 in the rest position and with an extension element attached to the roller end in accordance with the invention.

FIG. 4 shows the exemplary actuating drive 1 according to FIG. 2 in the rest position RS and with an extension element 22 attached to the roller end RE. In this case, too, the wound flat spring 2 is pretensioned as a result of the partial unwinding of the spring strip 21. The wound flat spring 2 extended in this manner is designated in the following as the extended constant-force spring 2'. Here, the extended constant-force spring 2' has a free roller end RE, which is extended by a linear or strip-type extension element 22. This extension element 22 is embodied in particular to be non-rigid with high tensile strength. It can be for example a strip, a belt, a cable, a strand or a chain. In this way, the spring force for both directions of rotation SR, SL is exactly the same and substantially constant, since the extension element 22 lacks the property of spring elasticity.

Figure 5:
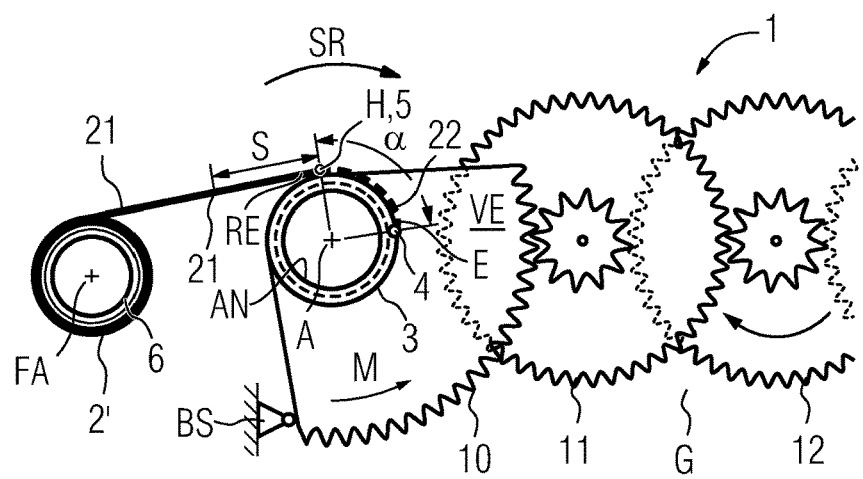
FIG. 5 shows the exemplary actuating drive according to FIG. 4 in an operating position.

FIG. 5 shows the exemplary actuating drive 1 according to FIG. 4 in an operating position BS. As shown in FIG. 5, only the extension element 22 is wound up on the shaft portion 3 in this position BS.

Figure 6:
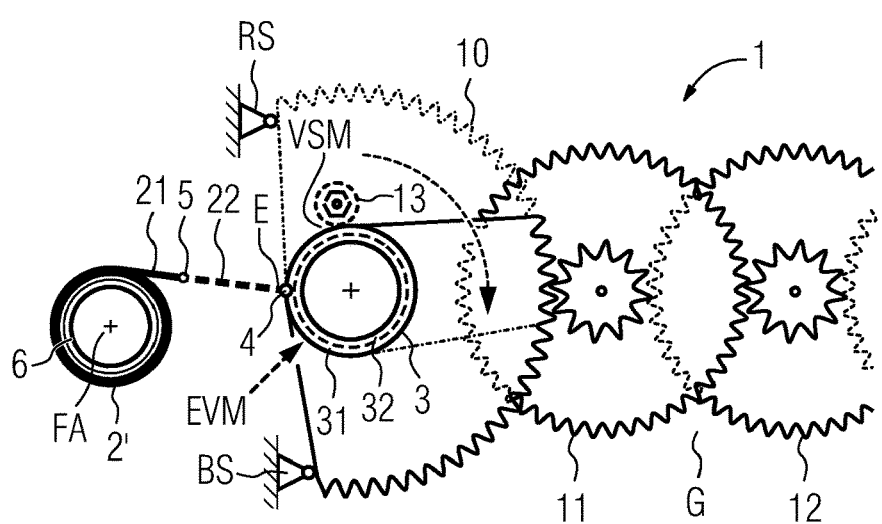
FIG. 6-FIG. 8 show the exemplary actuating drive according to FIG. 4 with step-by-step reversal of the direction of rotation from clockwise to counterclockwise with the help of an unlocking and locking mechanism and with the help of a pretensioning mechanism incorporating teachings of the present disclosure.
Figure 7:
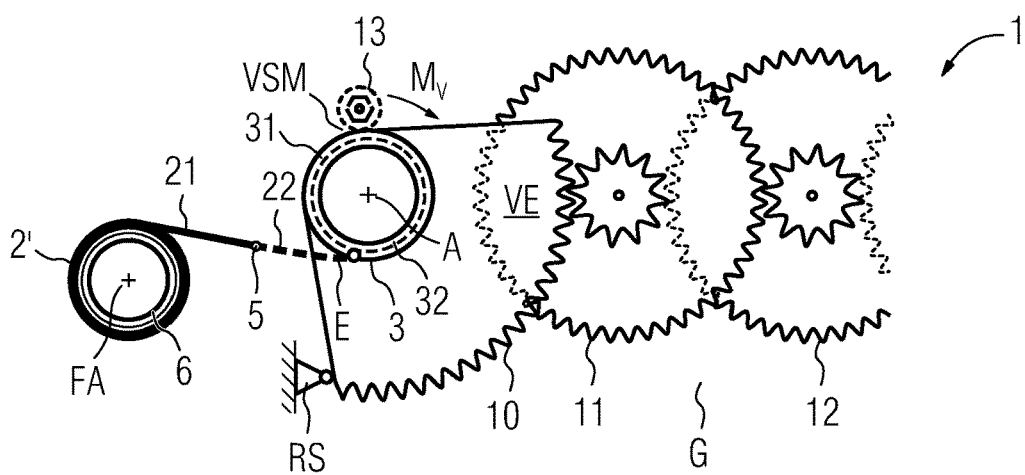
Figure 8:
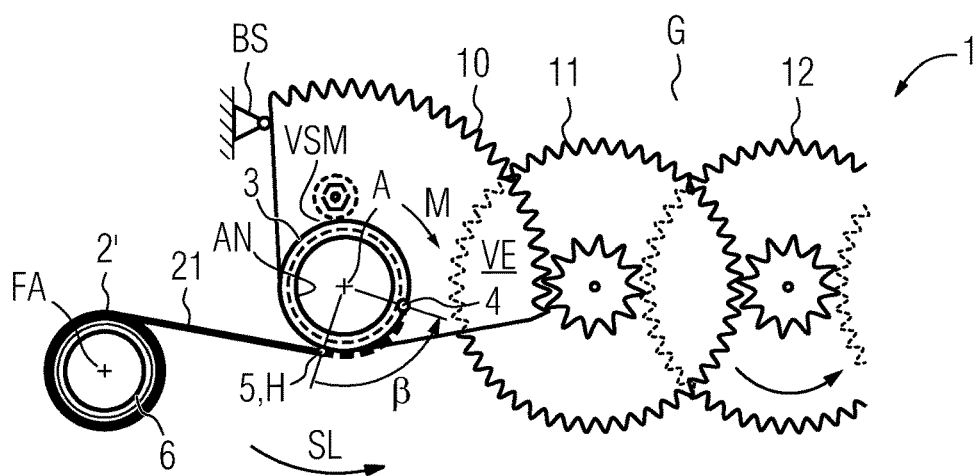

In FIG. 6 to FIG. 8, the exemplary actuating drive 1 according to FIG. 4 is now shown in a step-by-step reversal of the direction of rotation from a clockwise direction SR to a counterclockwise direction SL with the help of an unlocking and locking mechanism EVM and with the help of a pretensioning mechanism VSM in accordance with the invention.

FIG. 6 shows how the tangential rotational fixing between the actuation element 10 together with the actuation connection point SA on the one hand and the shaft portion 3 on the other hand is released. The wound flat spring or constant-force spring 2 is thus decoupled from the actuation element 10 and from the remaining gear unit G. The straight arrow drawn in symbolizes by way of example a radial disengagement of a rotational fixing element (not shown further) of the unlocking and locking mechanism EVM. The rotational fixing element can be for example a bolt or a bar. The rotational fixing element releases the rotational fixing between a radially internally disposed part 32 connected in a fixed manner to the shaft portion 3 and a radially externally disposed part 31 of the shaft portion 3 disposed coaxially thereto by means of a release element which can be operated on the housing of the actuating drive 10.

The release element can be for example a slide, push button or switch. When the exemplary release element is operated and held in place, the shaft portion 3 or its radially externally disposed part 31 now rotates automatically in the counterclockwise direction, in other words into the intermediate or neutral position shown in FIG. 6, on account of the active pretensioning. The actuation element 10 with the radially internally disposed part 32 of the shaft portion 3 connected in a fixed manner thereto itself still remains in the rotational position shown with a dashed line. The decoupled actuation element 10 can now for example be moved manually into the rotational position shown with a solid line, wherein the gear unit G and the motor (not shown further) are also moved. In some embodiments, the motor can be switched on in order to move the actuation element 10 into the rotational position shown with a solid line.

According to the subsequent FIG. 7, the radially externally disposed part 31 of the shaft portion 3 is rotated counterclockwise by means of a toothed wheel 13 as part of a pretensioning mechanism VSM. As a result, the free end E of the wound flat spring 2 attached to the outer circumference of the shaft portion 3 is moved into the indicated lower position with the application of a pretension. Once the direction of rotation has been changed in this way, the tangential rotational fixing in the shaft portion 3 is restored, for example by radially re-engaging the bolt or bar connected to the slide or pushbutton. When the actuation direction of rotation is reversed from a clockwise direction SR to a counterclockwise direction SL, the function of the end stop detection is also reversed. In other words, the rest position RS now becomes the operating position RB and vice versa. This must be taken into account by a suitable evaluation by means of a control unit of the actuating drive 1.

Finally, FIG. 8 now shows the actuation element 10 in a counterclockwise direction SL in the operating position BS. The actuation angle β shown typically corresponds in terms of amount to the actuation angle α in the clockwise direction SR of the actuating drive 1.

Figure 9:
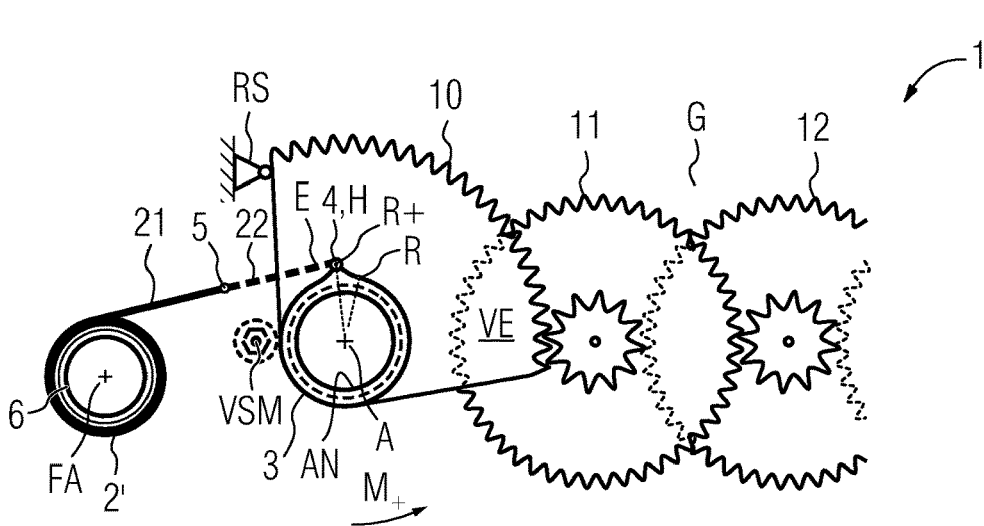
FIG. 9-FIG. 11 show an example of an actuating drive with different rotational positions and directions of rotation and with a hinge as the shaft portion region with an increased shaft portion radius incorporating teachings of the present disclosure.
Figure 10:
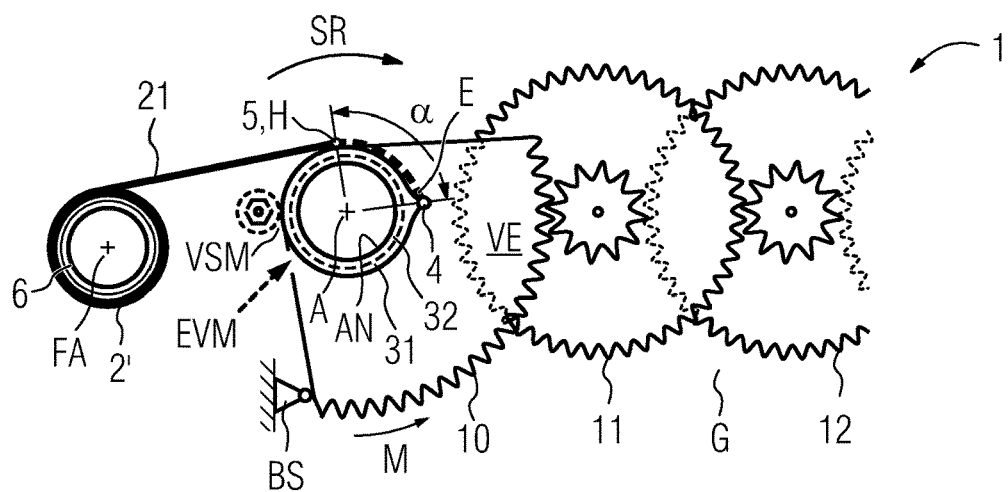
Figure 11:
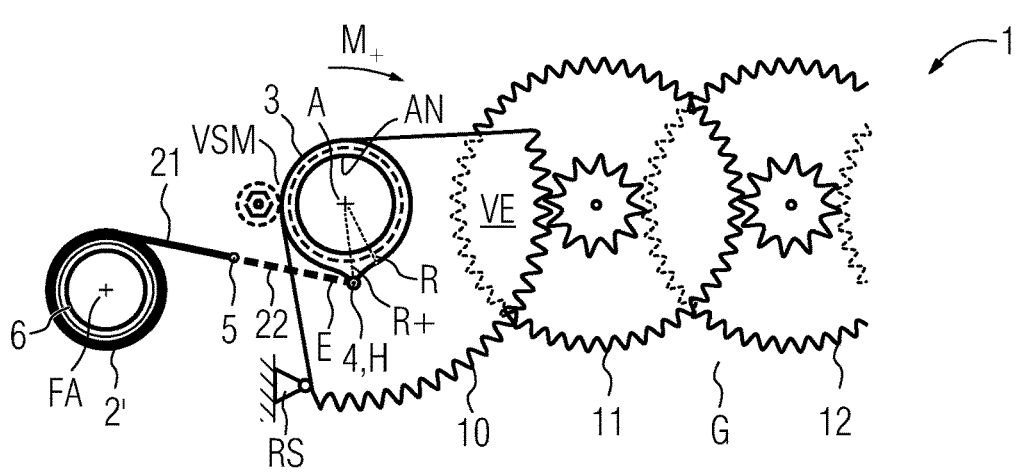
Figure 12:
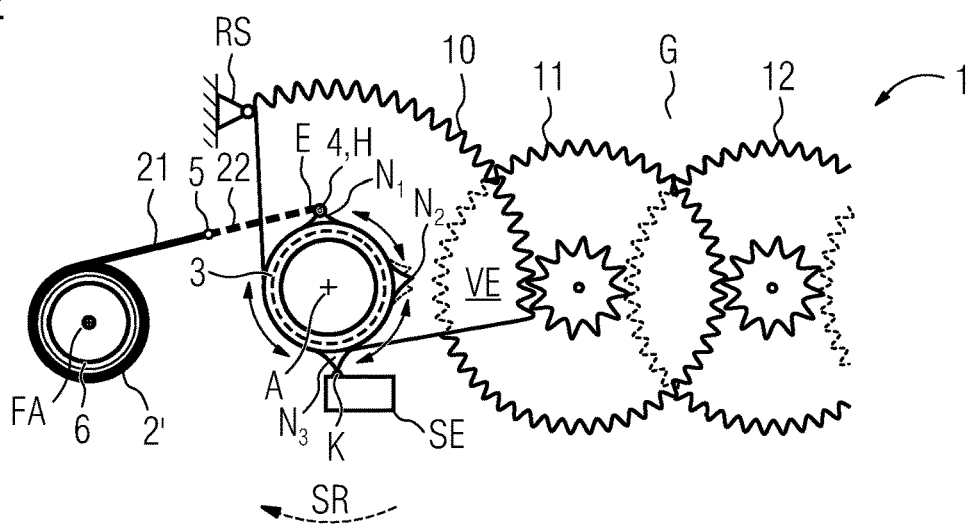
FIG. 12-FIG. 15 show an example of an actuating drive with different rotational positions and directions of rotation and with several control cams for operating a switch element for end position monitoring incorporating teachings of the present disclosure.

FIG. 9 to FIG. 11 show an example of an actuating drive 1 with different rotational positions RS, BS and directions of rotation SR, SL and with a hinge 4 as the shaft portion region 3 with an increased shaft portion radius R+ incorporating teachings of the present disclosure.

In comparison thereto, the free spring end E of the wound flat spring 2 is now fastened to a hinge 4 mounted on the radial outer circumference of the shaft portion 3. Said hinge can be rotated about a pivot axis running parallel to the actuation axis A. As a result, it is possible to pivot the hinge 4 smoothly and automatically during a reversal of the direction of rotation.

The free spring end E of the wound flat spring 2 can be fastened for example to a hollow-cylindrical sleeve. The longitudinal symmetry axis of the sleeve is disposed in the plane of the spring end 21 or in the plane of the preferably strip-type extension element 22. In addition, the sleeve is fastened to the free spring end E such that the longitudinal symmetry axis of the sleeve is at right angles to the direction of the spring force F. The sleeve can then be inserted easily between two opposite bearings of the hinge 4 and fastened by means of a suitable locking pin, which extends through both bearings and through the sleeve with minimal play.

The shaft portion 3 shown in FIG. 9 to FIG. 11 has a substantially uniform shaft portion radius R, apart from a tangential shaft portion region which corresponds to the hinge 4. In comparison thereto, the tangential shaft portion region or the hinge 4 has an increased shaft portion radius R+. In the present example, the tangential shaft portion region is arranged such that in the rest position shown it is simultaneously the lever point H for the free spring end E acting on the shaft portion 3. As a result of the increased shaft portion radius R+, an increased closure torque $M_+$ is also produced in the rest position RS shown on account of the greater lever, in other words on account of the increased shaft portion radius R+. In this safe, de-energized rest position RS, a greater increased closure torque $M_+$ is then applied to a smoke flap or a valve, for example.

Figure 13:
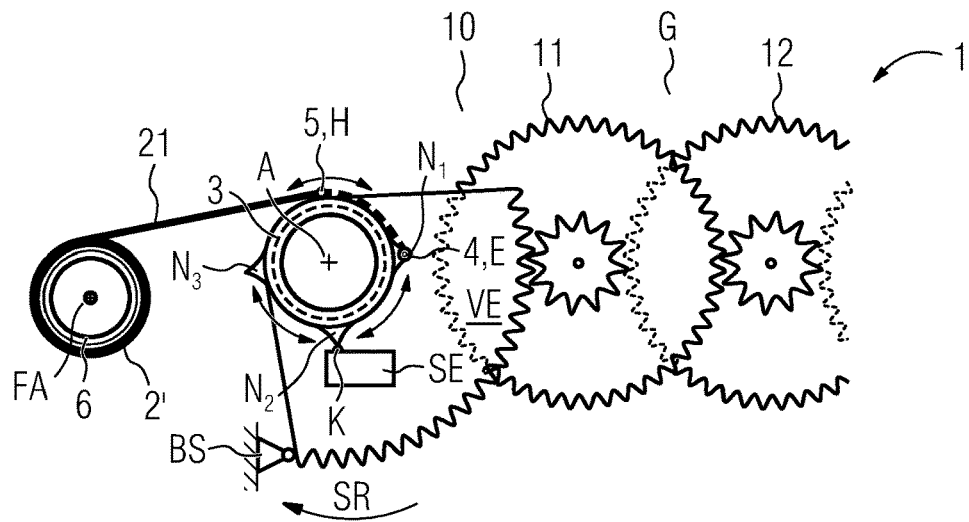
Figure 14:
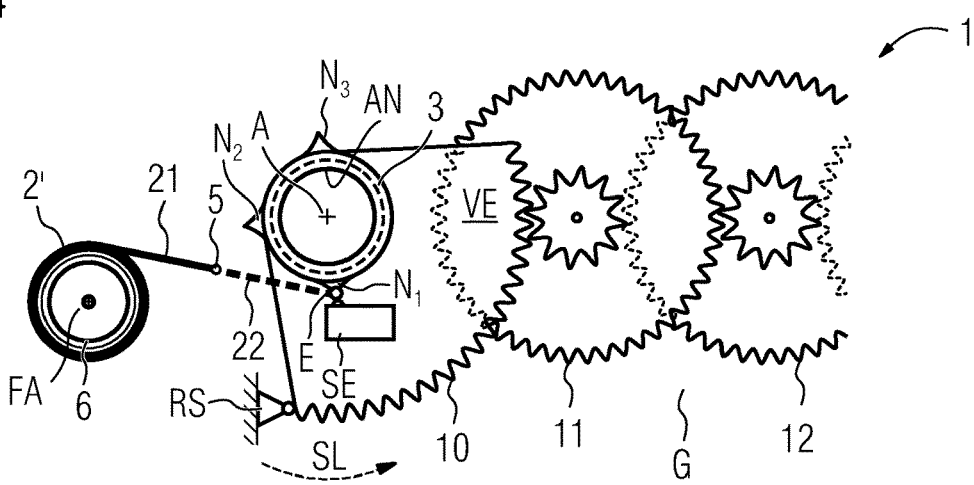
Figure 15:
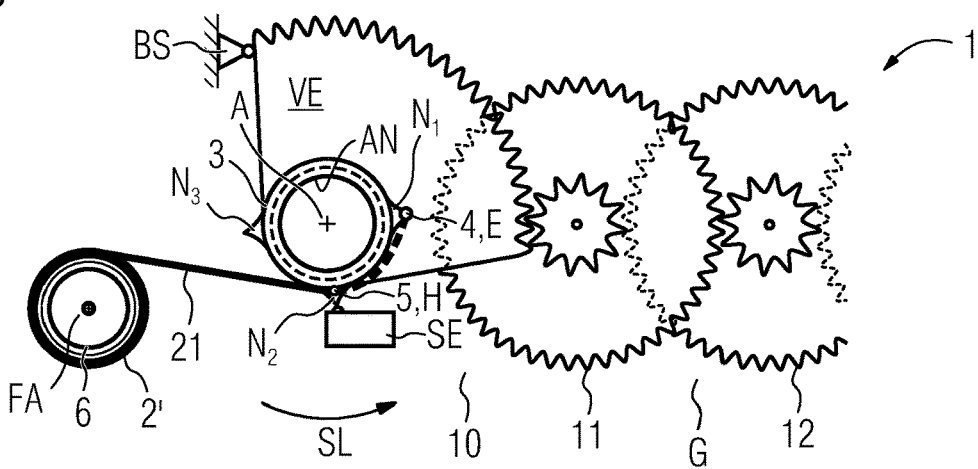

FIG. 12 to FIG. 15 show an example of an actuating drive 1 with different rotational positions RS, BS and directions of rotation SR, SL and with several control cams $N_1$ to $N_3$ for operating a switch element SE for end position monitoring in accordance with the invention. The rotational positions in FIG. 12 and FIG. 14 correspond in terms of their function substantially to those of the preceding figures FIG. 9 and FIG. 11. In comparison to FIG. 12 and FIG. 14, the figures FIG. 13 and FIG. 15 are moved from the respective rest position RS into the corresponding operating position BS.

In this example, three control cams $N_1$-$N_3$ are arranged on the shaft portion 3 in a distributed manner tangentially to the actuation axis A. Here, the actuating drive 1 has only a single electrical switch element SE, which can be operated by the respective control cams $N_1$-$N_3$ for monitoring the end position of the actuation element 10. The switch element SE can be for example a microswitch or a proximity sensor. A rest and operating position RS, BS can thus be assigned to each switch operation, for both directions of rotation SR, SL respectively. The control cams $N_1$-$N_3$ can be arranged such that they can be displaced and fixed about the actuation axis A for adjusting these "end stops" in the tangential direction. In the case of a 90° actuation angle range shown here, it is possible to dispense with one of the otherwise four required combinations of direction of rotation (clockwise, counterclockwise) and end positions (rest position and operating position). The reason for this is that the control cam $N_2$ is operated both in the operating position BS and in the clockwise direction (FIG. 13) as well as in the operating position BS and in the counterclockwise direction (FIG. 15).

In the example of FIG. 12 to FIG. 15, one of the control cams, here control cam $N_1$, is simultaneously the hinge 4 mounted on the radial outer circumference of the shaft portion 3.

List of Reference Characters
1 Actuating drive
2 Wound flat spring, roller spring, constant-force spring, drive spring
2' Extended wound flat spring, extended roller spring, extended drive spring, extended constant-force spring
3 Shaft portion, tangential shaft portion
4 Fastening point, hinge, rivet, joint
5 Connection element, rivet, weld, adhesion point
6 Hub, drum
10-12 Toothed wheels
10 Output toothed wheel, toothed segment
11, 12 Transmission toothed wheel
13 Pretensioning toothed wheel
21 (Steel) spring strip with radial pretensioning
22 Extension element, tension strap, cable
31 Radially internally disposed part of the shaft portion
32 Radially internally disposed part of the shaft portion
A Actuation axis
AN Actuation connection point, actuation element
B Strip width
$D_A$ Outer diameter
$D_I$ Inner diameter
E Spring end, free spring end
EVM Unlocking and locking mechanism
FA Spring axis, roller axis
G Gear unit
H Lever point
K Switch, switch operation element
M Restoring torque
$M_V$ Restoring torque with pretensioning
$M_+$ Increased restoring torque
$N_1$-$N_4$ Control cams, tangential shaft portion
R Outer radius of the shaft portion, shaft radius
RB Outer radius of the roller spring
RE Roller end, roller spring end, free spring end
R+ Increased outer radius of the shaft portion
S Spring travel
SE Electrical switch element
SR First actuation direction, clockwise
SL Second actuation direction, counterclockwise
VE Toothing plane
VSM Pretensioning mechanism
$\alpha$, $\beta$ First, second actuation angle, actuation angle range
$\pi$ Pretensioning angle

What is claimed is:

1. An actuating drive comprising:
a drive element;
an actuation element with an actuation connection point, wherein the drive element drives the actuation element indirectly about an actuation axis;
wherein the actuation element includes a shaft portion arranged concentrically to the actuation axis, extends at least partially circumferentially in the longitudinal direction;
a restoring spring comprising a wound flat spring providing a restoring torque acting on the actuation element, wherein the flat spring acts tangentially on the shaft portion and includes a spring axis, and a free spring end tangentially fastened to the shaft portion;
wherein the free spring end of the wound flat spring is radially externally disposed with respect to the spring axis and fastened tangentially to the shaft portion;
wherein the wound flat spring is mounted rotatably such that the spring axis thereof is radially spaced apart from the actuation axis and aligned parallel to the actuation axis; and
wherein the actuation element is arranged such that it can be rotated about its actuation axis within a predefined angle of rotation range between a rest position and an operating position;
wherein the free spring end is fastened to a fastening point mounted on the radial outer circumference of the shaft portion;
wherein the fastening point comprises a hinge which can be rotated about a pivot axis running parallel to the actuation axis.

2. The actuating drive as claimed in claim 1, wherein the wound flat spring comprises a roller spring with a number of windings resting directly on one another in the range from 1 to 5.

3. The actuating drive as claimed in claim 2, wherein the roller spring comprises a constant-force spring.

4. The actuating drive as claimed in claim 1, wherein the wound flat spring comprises a spiral drive spring with a number of windings in the range from 6 to 25.

5. The actuating drive as claimed in claim 1, wherein:
the wound flat spring has a free roller end extended by a non-rigid linear or strip-type extension element; and a free end of the extension element forms the free spring end of the wound flat spring.

6. The actuating drive as claimed in claim 1, wherein the actuating drive includes a manually operable mechanism for pretensioning the wound flat spring.

7. The actuating drive as claimed in claim 1, wherein:
the actuating drive includes a gear unit;
the drive element has a mechanical active connection with the actuation element via the gear unit; and
the actuation element includes a toothed segment as a gear-side output.

8. The actuating drive as claimed in claim 7, wherein a shaft portion of the toothed segment is axially spaced apart from a toothing plane thereof.

9. An actuating drive comprising:
a drive element;
an actuation element with an actuation connection point, wherein the drive element drives the actuation element indirectly about an actuation axis;
wherein the actuation element includes a shaft portion arranged concentrically to the actuation axis, extends at least partially circumferentially in the longitudinal direction;
a restoring spring comprising a wound flat spring providing a restoring torque acting on the actuation element, wherein the flat spring acts tangentially on the shaft portion and includes a spring axis, and a free spring end tangentially fastened to the shaft portion;
wherein the free spring end of the wound flat spring is radially externally disposed with respect to the spring axis and fastened tangentially to the shaft portion;
wherein the wound flat spring is mounted rotatably such that the spring axis thereof is radially spaced apart from the actuation axis and aligned parallel to the actuation axis; and
wherein the actuation element is arranged such that it can be rotated about its actuation axis within a predefined angle of rotation range between a rest position and an operating position wherein:
at least two control cams are arranged in a distributed manner on the shaft portion or axially adjacent thereto, tangentially to the actuation axis; and
the actuating drive includes an electrical switch element operated by the respective control cams for monitoring the end position of the actuation element.

10. The actuating drive as claimed in claim 9, wherein:
the shaft portion, apart from at least one tangential shaft portion region, has a substantially uniform shaft portion radius; and
wherein in comparison thereto the at least one tangential shaft portion region has an increased shaft portion radius.

11. The actuating drive as claimed in claim 9, wherein one of the control cams comprises a hinge mounted rotatably on a radial outer circumference of the shaft portion.

12. The actuating drive as claimed in claim 11, wherein the wound flat spring is already pretensioned in the rest position to provide the restoring torque.

13. An actuating drive comprising:
a drive element;
an actuation element with an actuation connection point, wherein the drive element drives the actuation element indirectly about an actuation axis;
wherein the actuation element includes a shaft portion arranged concentrically to the actuation axis, extends at least partially circumferentially in the longitudinal direction;
a restoring spring comprising a wound flat spring providing a restoring torque acting on the actuation element, wherein the flat spring acts tangentially on the shaft portion and includes a spring axis, and a free spring end tangentially fastened to the shaft portion;
wherein the free spring end of the wound flat spring is radially externally disposed with respect to the spring axis and fastened tangentially to the shaft portion;
wherein the wound flat spring is mounted rotatably such that the spring axis thereof is radially spaced apart from the actuation axis and aligned parallel to the actuation axis; and
wherein the actuation element is arranged such that it can be rotated about its actuation axis within a predefined angle of rotation range between a rest position and an operating position wherein:
the shaft portion arranged on the actuation element is fixed radially to the actuation element in relation to the actuation axis of the actuation element; and
the actuating drive has a manually operable unlocking and locking mechanism for disconnecting and restoring a tangential rotational fixing between the actuation element together with the actuation connection point and the shaft portion.

* * * * *